Oct. 12, 1965
R. P. GRENIER
3,210,880
UNDERWATER SPEAR GUN
Filed April 2, 1964
2 Sheets-Sheet 1
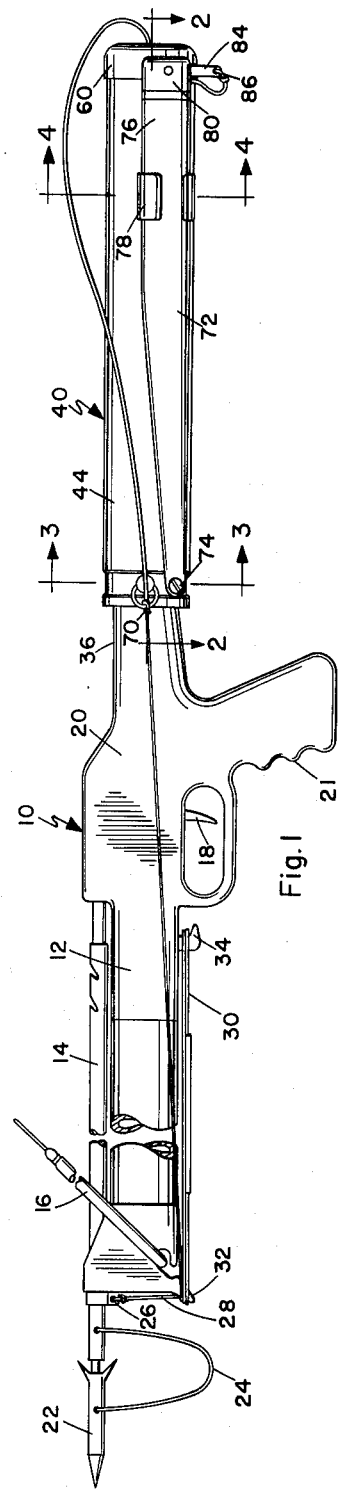
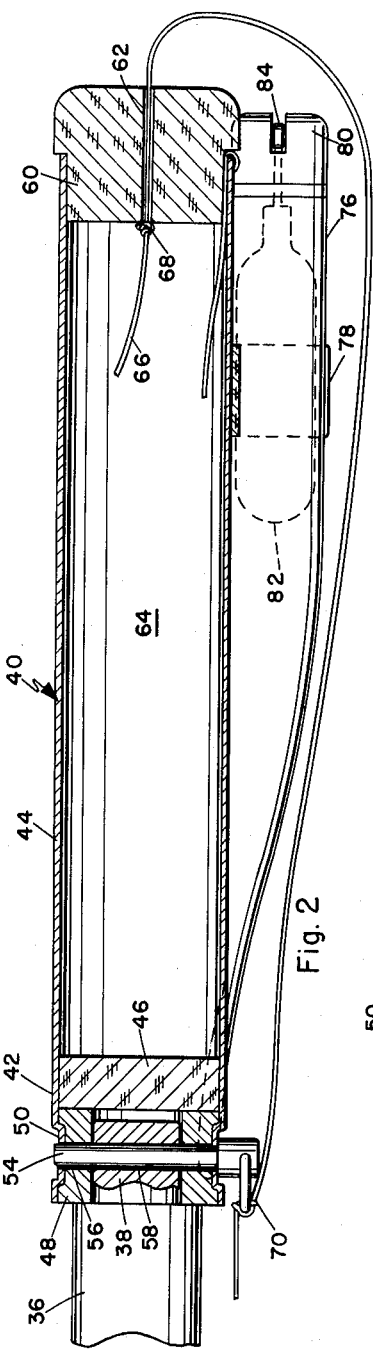
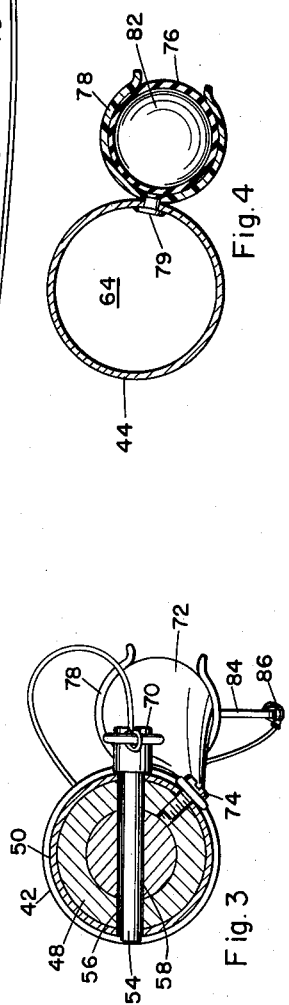
INVENTOR.
RICHARD PAUL GRENIER
BY
*Knox & Knox*

Oct. 12, 1965  R. P. GRENIER  3,210,880
UNDERWATER SPEAR GUN
Filed April 2, 1964  2 Sheets-Sheet 2
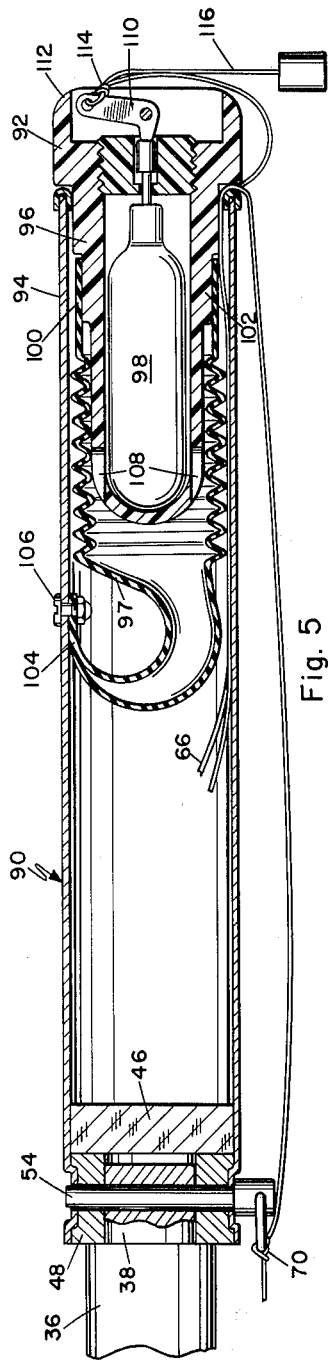
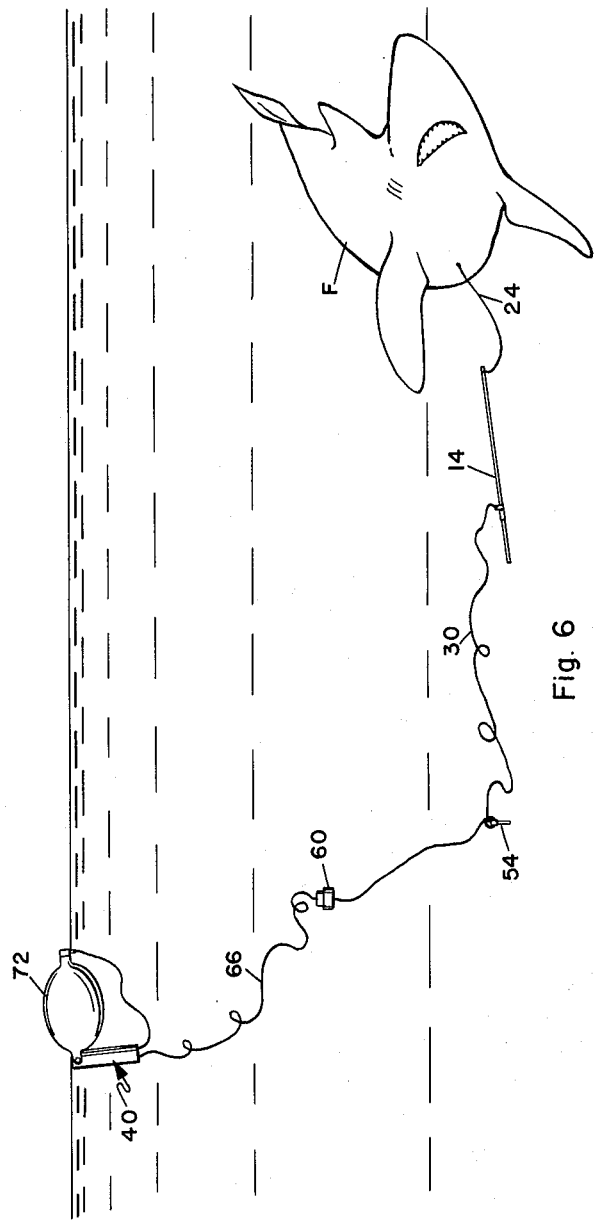
INVENTOR.
RICHARD PAUL GRENIER
BY
*Knox & Knox*

3,210,880
UNDERWATER SPEAR GUN
Richard P. Grenier, 962 Van Nuys St., San Diego, Calif.
Filed Apr. 2, 1964, Ser. No. 356,742
7 Claims. (Cl. 43—6)

The present invention relates to an underwater spear gun and more particularly to a detachable stock construction for such a gun in the form of a hollow container in which is housed a portion of the line which is attached to the spear head.

The primary object of this invention is to provide an improved stock construction for an underwater spear gun.

It is a further object of the invention to provide an improved stock construction in the form of a hollow elongated member which houses a portion of the line attached to the spear.

It is a still further object of the invention to provide an improved stock construction for a spear gun which may be manually detached from the gun or automatically detached after a speared fish has run a predetermined distance.

It is a still further and important object of this invention to provide an improved stock construction having an inflatable signal means associated therewith.

It is a still further object of this invention to provide an improved inflatable signal means carried by the stock of a spear gun which may be either manually or automatically inflated.

Finally it is an object to provide an underwater spear gun of the aforementioned character which is simple and convenient to use and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawings which form a material part of this disclosure, and in which:

FIGURE 1 is a side elevation view of the spear gun of the present invention with the novel stock attached thereto;

FIGURE 2 is a sectional view taken on the line 2—2 of FIGURE 1;

FIGURE 3 is a sectional view taken on the line 3—3 of FIGURE 1;

FIGURE 4 is a sectional view taken on the line 4—4 of FIGURE 1;

FIGURE 5 is a view similar to FIGURE 2 showing a modified form; and

FIGURE 6 is a view illustrating the operation of the float structure.

With particular reference to FIGURE 1, the numeral 10 indicates generally an underwater spear gun of conventional form. This spear gun is shown for illustrative purposes only, it being understood that other well known forms may be substituted therefor. The gun shown includes a barrel structure 12 on which is mounted a spear 14. Propelling mechanism for the spear 14 may consist of one or more rubber slings 16 suitably secured to the barrel 12 according to well known techniques. Spear 14 is adapted to be propelled by release of trigger mechanism 18 suitably mounted in hand grip portion 20, having a handle 21 extending therefrom, at the rear end of barrel 12. Spear 14 may, if desired, have a separable point 22 mounted thereon and secured thereto by a short length of line 24. Spear 14 also has secured thereto, at 26, a length of line 28, one portion 30 of which is coiled between a fixed lug 32 and a releasable lever 34. Release of trigger 18 also releases lever 34 permitting portion 30 of line 28 to be payed out as spear 14 is fired toward the target.

Formed integrally with the hand grip portion 20 and generally coaxial with barrel 12 is a short extension 36 which has a reduced portion 38 on the remote end thereof. Removably secured to extension 36 is an elongated cylindrical hollow container generally indicated by reference numeral 40. This container serves as a storage receptacle for a second portion of line 26 and it also functions in the manner of the well known gun stock to balance the barrel 12.

Container 40 is formed from thin tubular stock of any suitable non-corrosive material such as aluminum or alloys thereof. Adjacent end 42, tube 44 is provided with a plug 46 in watertight relation therewith. Outwardly of plug 46 tube 44 is provided with a collar 48 secured to tube 44 by any suitable means such as the lock seam 50. The inner diameter 52 of collar 48 is of such size as to snugly receive the reduced portion 38 on extension 36. Container 40 is retained in position by a pin 54 which extends through holes 56 and 58 in collar 48 and reduced portion 38, respectively. The other end of container 40 is closed by a plug 60 which has a central aperture 62 through which line 26 extends. The space between the plug 46 and the closure plug 60 provides an adequate storage space 64 for a second portion 66 of line 26 which is coiled or otherwise compacted into this space. This line is knotted as at 68 to prevent accidental removal from container 40. An intermediate section of line 28 is secured at 70 to pin 54 for a purpose that will be hereinafter described.

A collapsible inflatable member 72 has one end secured by any suitable means such as stud 74 to container 40. Member 72 is generally elongated and is retained adjacent its other end 76 by a clip 78 fixedly secured to container 40 by rivet 79. Member 72 is closed at end 76 by a plug 80 which carries a pressurized gas cartridge 82 which is adapted to be pierced, in a manner well known to the art, by actuation of trigger 84, which may be similar to the trigger 110 illustrated in detail in FIG. 5, resulting in inflation of member 72. The free end of that portion of line 66 which is housed in container 40 extends outside the container between the plug 60 and wall 44 and is secured at 86 to trigger 84.

*Operation*

The operation of the invention may best be understood from a consideration of FIGURE 6. The operation of spear gun 10 is generally conventional. Fish F is cited and when the diver gets within range, the gun is aimed and fired. If a hit is scored the separable point 22 will be lodged within the target and the line 24 will permit the spear 14 to hang clear of fish F. Portion 30 of line 26 will pay out automatically as the gun is fired and if the fish is a small one and the run is not too long, the diver may maneuver the fish without recourse to that portion of line 66 within container 40. However, if the fish is a large one and full of fight, the diver can turn the gun at right angles to the normal firing position so that line 26 can exert a direct pull on pin 54 thus withdrawing it completely from the position shown in FIGURE 2. The gun may then be turned so that plugged end 60 of container 40 generally faces the direction in which the fish is running. The direct pull on knot 68 will dislodge the plug 60 and portion 66 of the line will be free to pay out of container 44. At this point the diver may trip trigger 84 which will puncture gas cartridge 82 thereby inflating inflatable member 72 which will in the process be disengaged from clip 78. With the pin 54 removed, container 40 can be freely slipped off extension 38 and will be carried to the surface of the water by member 72 which is now fully inflated. If for any reason the diver neglects to trip the trigger 84 this will be accomplished automatically when all the line is payed out of the container by reason of the fact that the end of the line is secured at 86 to trigger 84. Thus it will be seen that as the line tensions due to the run of the fish, trigger 84 will be operated to puncture pressurized gas cartridge 82.

Member 72, in fully inflated condition, as shown in FIGURE 6, serves as a large visible balloon marking the position of the fish and can be easily spotted and picked up by the diver after surfacing.

FIGURE 5 shows a modified form of container 90 in which the collapsible inflatable member is carried inside the container rather than on the outside. In this form the plug 92 closes the end of tube 94 and is provided with an extension 96 which encloses a pressurized gas cartridge 98. One end of collapsible inflatable member 97 is secured to reduced portion 102 of extension 96 while the other end 104 is secured to the tube 94 by any suitable means such as bolt 106. Trigger mechanism 110 is housed within a cylindrical extension 112 of plug member 92. Line 66 has the end thereof secured to the trigger mechanism at 114 similarly to that shown in the modification of FIGURE 2. An extension 116 is provided for manual actuation of trigger 110. When pressurized gas cartridge 98 is punctured, gas will flow through openings 108 inflating member 97 and forcing plug 92 out of tube 94. Otherwise the operation of this modification is the same as that of FIGURE 2.

It is understood that minor variation from the form of the invention disclosed herein may be made without departure from the spirit and scope of the invention, and that the specification and drawings are to be considered as merely illustrative rather than limiting.

I claim:
1. In an underwater spear gun including an elongated barrel, a hand grip and trigger release on one end of said barrel, a spear operatively associated with said barrel and trigger release and a line, one end of which is connected to said spear, a first portion of said line being carried by said barrel, the improvement which comprises:
   an elongated hollow container;
   removable means detachably securing said container to said hand grip;
   said container being adapted to receive a second portion of said line; and
   attachment means securing the other end of said line to said container comprising an inflatable means and means operatively connected with said inflatable means for inflating said inflatable means.

2. The combination of claim 1 in which said removable means is attached to said line between said first and second portions.

3. The combination of claim 2 in which said attachment means is carried within said container.

4. The combination of claim 2 in which said attachment means is secured to the outside of said container.

5. In an underwater spear gun including an elongated barrel, a hand grip and trigger release on one end of said barrel, a spear operatively associated with said barrel and trigger release, and a line, one end of which is secured to said spear, a first portion of said line carried by said barrel, the improvement which comprises:
   an elongated hollow container;
   removable means detachably securing said container to said hand grip;
   said container having stored therein a second portion of said line;
   said removable means being secured to said line between said first and second portions;
   a collapsible inflatable means secured to said container;
   a pressurized gas cartridge within said collapsible inflatable means;
   means to rupture siad pressurized gas cartridge, the other end of said line connected to said last mentioned means.

6. The combination of claim 5 in which said collapsible inflatable means is positioned within said container.

7. The combination of claim 5 in which said collapsible inflatable means is secured to the outer surface of said container.

References Cited by the Examiner

UNITED STATES PATENTS

| 2,853,724 | 9/58 | Smith | 9—9 |
| 3,132,626 | 5/64 | Reid | 9—9 XR |

FOREIGN PATENTS

| 411,151 | 7/45 | Italy. |
| 492,696 | 3/54 | Italy. |

ABRAHAM G. STONE, *Primary Examiner.*